3,378,277
TANDEM AXLE SUSPENSION
Francis O. Gadd, Birmingham, Mich., assignor to General Motors Corporation, Detroit, Mich., a corporation of Delaware
Filed Jan. 11, 1966, Ser. No. 519,897
3 Claims. (Cl. 280—104.5)

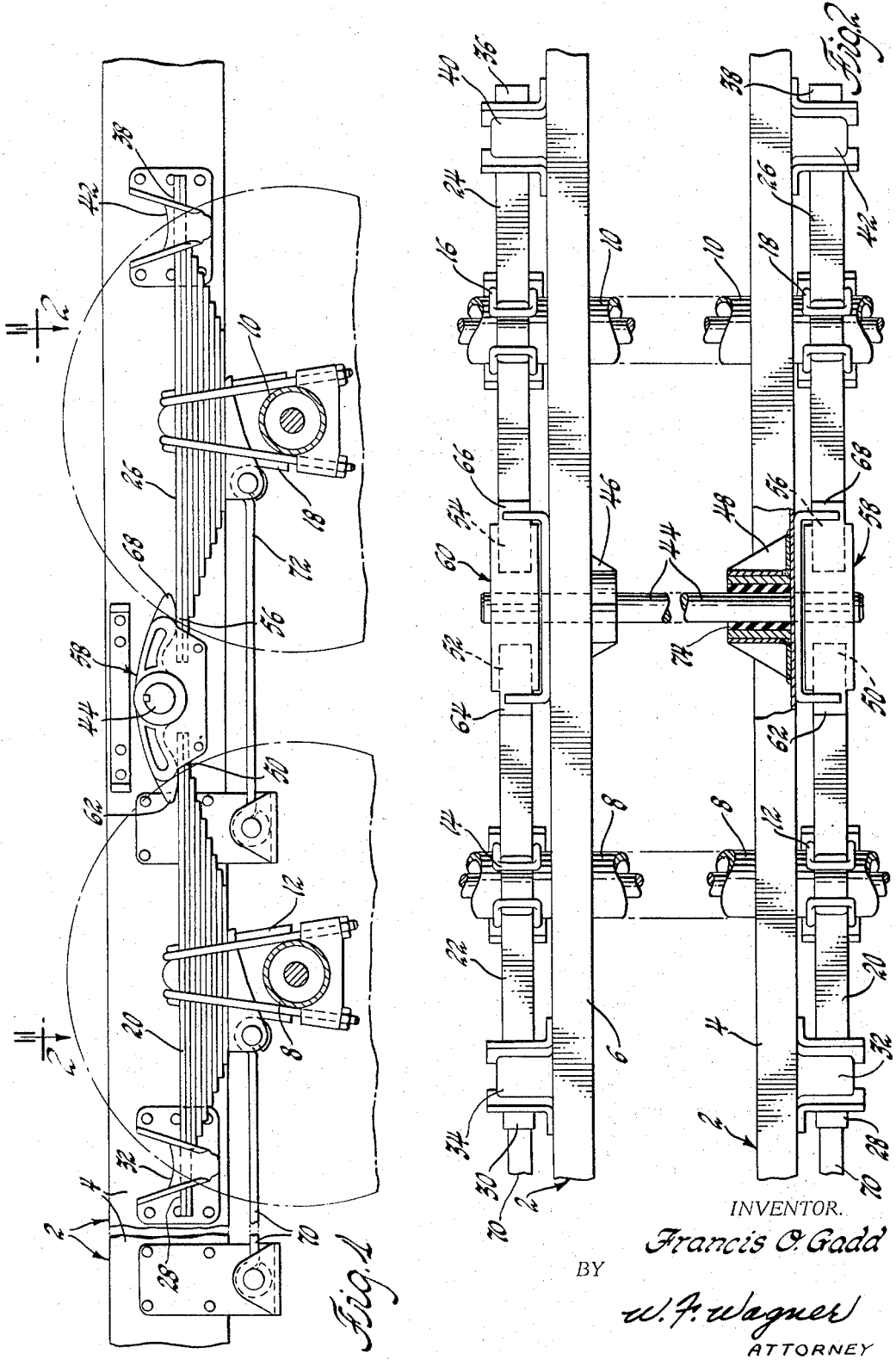

ABSTRACT OF THE DISCLOSURE

In a conventional leaf spring tandem axle suspension, a pair of walking beams are mounted on a transverse torsion bar so that load imposed on one wheel of one axle will be transferred to both of the springs on the other axle.

---

This invention relates to tandem axle suspension and more particularly to tandem axle constructions incorporating means for equalizing load transfer resulting from single wheel deflection.

An object of the invention is to provide an improved tandem axle suspension.

Another object is to provide a tandem axle suspension incorporating equalizing means effective to transfer reaction forces produced by deflection of one wheel on one axle to both wheels of the other axle.

In prior art constructions such as U.S. 1,893,695, Chenoweth, it has been proposed to produce tandem axle constructions wherein deflection of one wheel of one axle causes partial transmission of reaction forces to the opposite wheel of the other axle. In this type of construction, the load transfer is not only diagonally of the vehicle, but to be effective for both sides of the vehicle, the use of two transversely extending transfer elements is required. In contrast, the present invention not only reduces the complexity of the structure by eliminating one of the transverse elements, but additionally distribution of equalizing effect is extended to a third wheel.

The foregoing and other objects, advantages and features of the invention will become more fully apparent as reference is had to the accompanying specification and drawing wherein:

FIGURE 1 is a fragmentary side elevational view of a chassis suspension incorporating the invention; and FIGURE 2 is a fragmentary plan view looking in the direction of arrows 2—2 of FIGURE 1.

In the drawing, the reference numeral 2 generally designates a vehicle frame or superstructure comprising parallel longitudinally extending side rail members 4 and 6 beneath which are disposed longitudinally spaced transversely extending axles 8 and 10, the opposite ends of each of which are connected in conventional manner with the usual road wheels. In accordance with the general features of the invention, each axle 8 and 10 has secured thereto near each opposite end, by means of clamp structures 12, 14 and 16, 18, respectively, pairs of leaf spring assemblies 20, 22 and 24, 26, respectively, which resiliently support the superstructure relative to the wheels. The forward ends 28, 30 of springs 20 and 22 are arranged in upward abutting engagement with spring seats 32 and 34, while the rearward ends 36 and 38 of springs 24 and 26 are similarly arranged in abutting engagement with spring seats 40 and 42.

According to the principal feature of the invention, a torsionally active bar element 44 is disposed transversely of frame 2 and rotatably mounted near each opposite end in laterally opposite bearing assemblies 46 and 48 longitudinally midway between the rearward ends 50, 52 of springs 20, 22 and the forward ends 54, 56 of springs 24, 26. At each of its opposite ends outboard of side rails 4 and 6, bar 44 has rigidly secured thereto longitudinally extending walking beams 58 and 60, each of which includes forwardly projecting lip portions 62 and 64 which respectively overlie and abut the rearward ends 50, 52 of springs 20 and 22 and rearwardly projecting lip portions 66 and 68 which respectively overlie the forward end portions 54, 56 of springs 24 and 26.

When arranged in the manner described, the present suspension arrangement under normal load conditions causes the entire sprung load to be evenly distributed over the four suspension springs 20, 22, 24 and 26, while geometric stability of the axles is accomplished by torque rods 70 and 72 connected between the frame 2 and axles 8 and 10 in the conventional manner.

When the vehicle is subjected to uneven load distribution on each individual wheel, such as occurs on localized road impact, the suspension arrangement of the invention functions as follows. Assume an operating condition in which the left wheel on the front axle 8 encounters a bump. Under such conditions, upward deflection of the wheel induces corresponding upward deflection of axle 8 in the vicinity of spring 20. Upon upward deflection of spring 20, the rearward end thereof acts against forward projection 62 of walking beam 58 causing clockwise rotation thereof which simultaneously causes a downward angular movement of the rearward projection 68 with attendant downward deflection of the forward end 56 of spring 26. This downward deflection of the forward end of spring 26 is transmitted through the body of the entire spring 26 to produce an upward reaction at the rearward end thereof and thus distributes the reaction throughout the entire length of both springs 20 and 26. Concurrently with clockwise rotation of walking beam 58, the transversely extending torsion bar 44 is caused to rotate clockwise and impart corresponding clockwise rotation to walking beam 60 at the opposite side of the vehicle, which in turn causes a downward movement of rearward projection 66 and thus acts on spring 24 in the same manner described with reference to spring 26. As a result, the localized impact on one wheel of the tandem axle construction is distributed or equalized both longitudinally of the axle construction as well as diagonally thereof. Additionally, the added degree of equalization operates to more effectively damp vibrations normally excited by such operation.

According to another feature of the invention, the torsional rate of bar 44 may be varied so as to produce a selected amount of load transfer to the diagonally opposite wheel. Further, the bar 44 is mounted in rubber bushings 74 to further enhance damping of vibrations excited in the system.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. An equalizing tandem axle suspension comprising first and second axles, a superstructure overlying said axles, a pair of laterally spaced longitudinally extending leaf springs connected to each axle, means on said superstructure directly engaging the forward ends of one pair of springs and the rearward ends of the other pair of springs, a torsionally active member comprising a single transversely extending bar rotatably supported in elastic bushings and otherwise unrestrained on said superstructure between the adjacent ends of said pairs of springs, and a walking beam fixedly connected at each end of said member, each beam having forward and rearward projecting portions overlying and abutting the adjacent ends of said springs.

2. The suspension of claim 1 wherein said means on said superstructure comprises spring seats arranged in overlying abutting relation with the respective ends of said springs.

3. The suspension of claim 1 including torque rods connecting and aligning said axles with said superstructure.

References Cited
UNITED STATES PATENTS

| | | | |
|---|---|---|---|
| 2,399,284 | 4/1946 | Moore | 280—104.5 |
| 2,880,991 | 4/1959 | Ward | 280—104.5 |
| 3,241,855 | 3/1966 | Kersey | 280—104.5 |

BENJAMIN HERSH, *Primary Examiner.*

PHILIP GOODMAN, *Examiner.*